(No Model.)
J. F. FOULKE.
MACHINE FOR OVERTHROWING TREES.
No. 396,738.                     Patented Jan. 29, 1889.
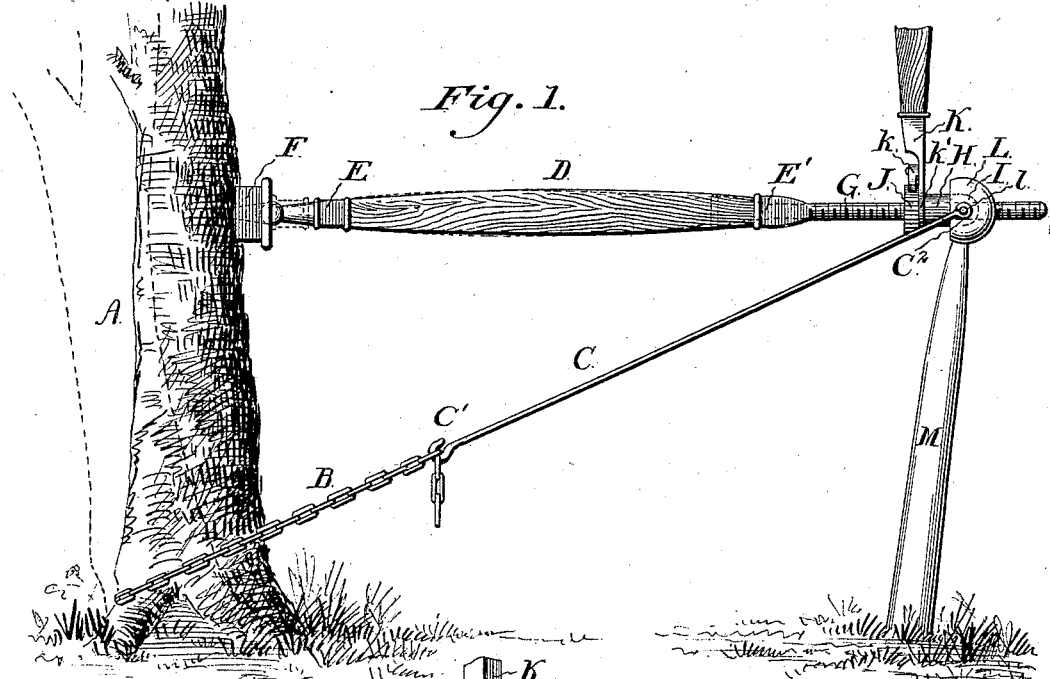
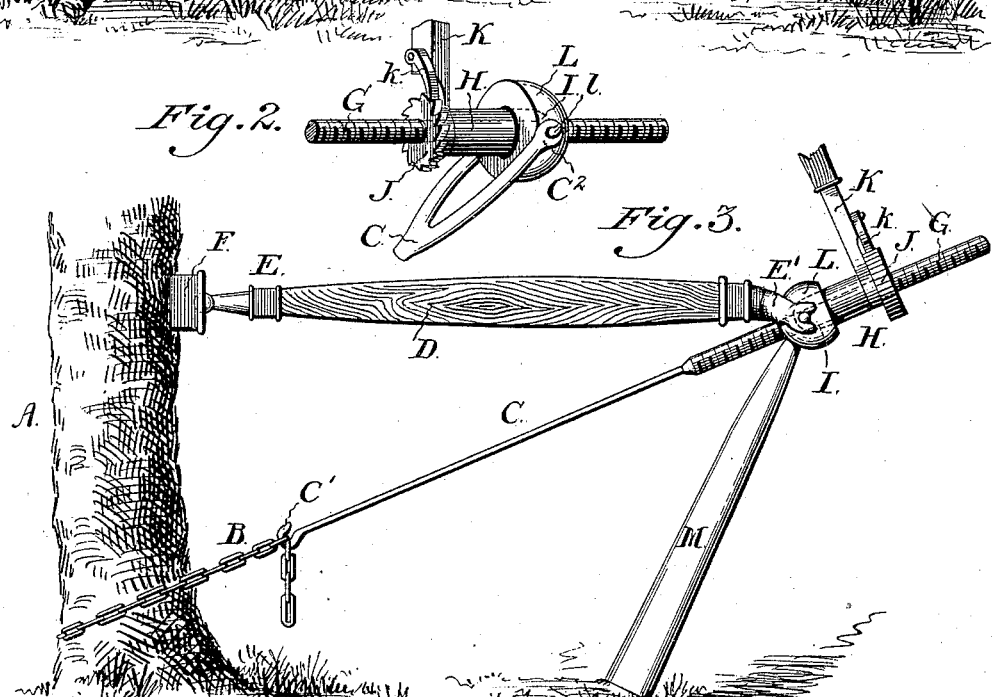
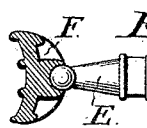
Witnesses.                       Inventor,
O. F. Eagle                      John F. Foulke
Joshua Matlack, Jr.              By his Attorney
                                 Francis T. Chambers

United States Patent Office.

JOHN FRANCIS FOULKE, OF PHILADELPHIA, PENNSYLVANIA.

MACHINE FOR OVERTHROWING TREES.

SPECIFICATION forming part of Letters Patent No. 396,738, dated January 29, 1889.

Application filed September 22, 1887. Serial No. 250,400. (No model.)

*To all whom it may concern:*

Be it known that I, JOHN FRANCIS FOULKE, a resident of Philadelphia, State of Pennsylvania, have invented a new and useful Machine for Overthrowing Trees, of which the following is a true and exact description, due reference being had to the accompanying drawings, which form a part of this specification.

The object of my invention is to provide a machine by means of which trees may be uprooted and thrown down preparatory to clearing forest land, and the troublesome and expensive plan of cutting down the trees and then uprooting the stumps done away with. This I accomplish by means of the apparatus hereinafter described, my invention consisting, generally speaking, of a triangular truss or frame having one side consisting of or readily attachable to a portion of a tree-trunk, in combination with a support for the free end of the triangle, and mechanism whereby the strut extending away from the tree-trunk may be relatively lengthened with respect to the tie extending away from the tree and united with said strut at the free end of the triangle.

Reference being now had to the drawings, which illustrate my invention, Figure 1 shows my appliance in operative position upon a tree. Fig. 2 is a perspective view of the appliance shown in Fig. 1 for lengthening the strut of the truss or frame relatively to the tie. Fig. 3 shows a modification of my device, in which, instead of absolutely lengthening the truss, the same effect is attained by relatively shortening the tie of my frame; and Fig. 4 shows a convenient device for securing the end of the strut against the tree-trunk.

A is a tree, which, as shown, is made to serve as one side of my truss or frame.

B is a chain passing around the base of the tree-trunk.

C is a rod or pair of rods diverging to opposite sides of the tree-trunk and serving as the tie of my frame, each having a hook, C', at one end adapted to engage the chain B, and at the other end secured in or to a socket-piece, L, or its equivalent, which serves to unite it with the free end of a strong strut, D, one end of which, E', is also secured in or on the casting, and the other end of which, E, is secured against the tree-trunk above the chain B, preferably by means of a saddle, F, as shown.

M is a support, which may be of any convenient kind. Its function is to sustain the free end of the triangle or frame made up of C and D, and it is preferably secured to the socket-piece L, as shown.

G is a screw secured on the end of one member of the truss. It extends through the socket-piece L.

H is a nut or sleeve threaded internally to work upon screw G. One end of H is rounded to enter and bear against a hemispherical socket, I, in socket-piece L, and to its other end is secured a ratchet-wheel, J. When the screw is secured upon the compression member or strut of the truss, the sleeve H is placed between the tree and the stirrup L, as shown in Fig. 1; or if the screw be secured to the tension member of the rod or rods, the stirrup is placed between the nut and the tree, as shown in Fig. 3, so that by revolving the nut, by means of the ratchet-wheel and a lever and pawl, the end E of the strut is forced strongly against the tree.

K is a lever secured to the sleeve H by means of a loose collar or strap, $k'$, as shown, and having secured upon it a pawl, $k$, adapted to engage with the ratchet J.

$l$ is one of two opposite lugs or horns formed on the socket-piece L, and to which the tie-rod C may be secured, as shown in Fig. 2.

The operation of the device is easily followed. The apparatus being secured against a tree-trunk, as shown, the operator, by means of the lever K with its pawl $k$, turns the screw-sleeve H, through the ratchet J, the sleeve abutting against the socket-piece L. The screw G is forced forward or backward, according to its connection with the strut or tie, and the strut D is forced against the tree, which must yield before it, and is thus finally overthrown by the continued advancement of the strut.

Of course any convenient mechanism for turning the screw-threaded sleeve may be substituted for the pawl and ratchet shown; but this is, I believe, one of the best devices which could be used with my mechanism.

Any mechanic will of course recognize that the screw G and its nut may be replaced by its familiar equivalents, the wedge and lever in some of their forms; but for simplicity, compactness, and utility the screw will, I believe, be found by far the best.

Having now described my invention, what I claim as new, and desire to secure by Letters Patent, is—

1. As a device for overthrowing trees, a triangular truss or frame adapted to rest against or incorporate a tree-trunk on one of its sides, and having its other sides extending away from the tree, the upper one constituting a strut and the lower one a tie, in combination with an unyielding brace or support to prevent downward movement of the strut, a coupling for uniting the ends of the strut and truss, and mechanism whereby the said strut can be lengthened relatively to the tie, all substantially as and for the purpose specified.

2. As a device for overthrowing trees, a triangular truss or frame adapted to rest against or incorporate a tree-trunk on one of its sides, and having its other sides extending away from the tree, the upper one constituting a strut and the lower one a tie, in combination with a screw forming the end of one of the outwardly-extending sides of the truss, a perforated stirrup uniting the ends of said strut and tie, a threaded sleeve secured upon the threaded end of one side of the frame and abutting against the perforated stirrup, by means of which the strut may be lengthened proportionately to the tie, and an unyielding brace supporting the outer end of the truss, all substantially as and for the purpose specified.

3. In a device for overthrowing trees, a strut, D, tie C, and support M, said strut and tie being adapted to be secured to a tree-trunk, substantially as shown and described, in combination with a perforated stirrup, L, a threaded sleeve, H, engaged on a threaded end of one side of the frame and abutting against the socket-piece, and a lever, K, whereby the sleeve can be turned and the form of the truss or frame changed, so as to proportionately lengthen the strut relatively to the tie.

4. In a tree-overthrowing device, substantially as specified, the perforated socket-piece L, having a rounded socket, I, in combination with a threaded sleeve, H, having one rounded end adapted to fit in socket I and the other end provided with a ratchet, J, and a lever, K, secured upon the sleeve by a loose collar, $k'$, and having a pawl, $k$, all substantially as and for the purpose specified.

JOHN FRANCIS FOULKE.

Witnesses:
ISAAC NORRIS, 3d,
FRANCIS T. CHAMBERS.